UNITED STATES PATENT OFFICE.

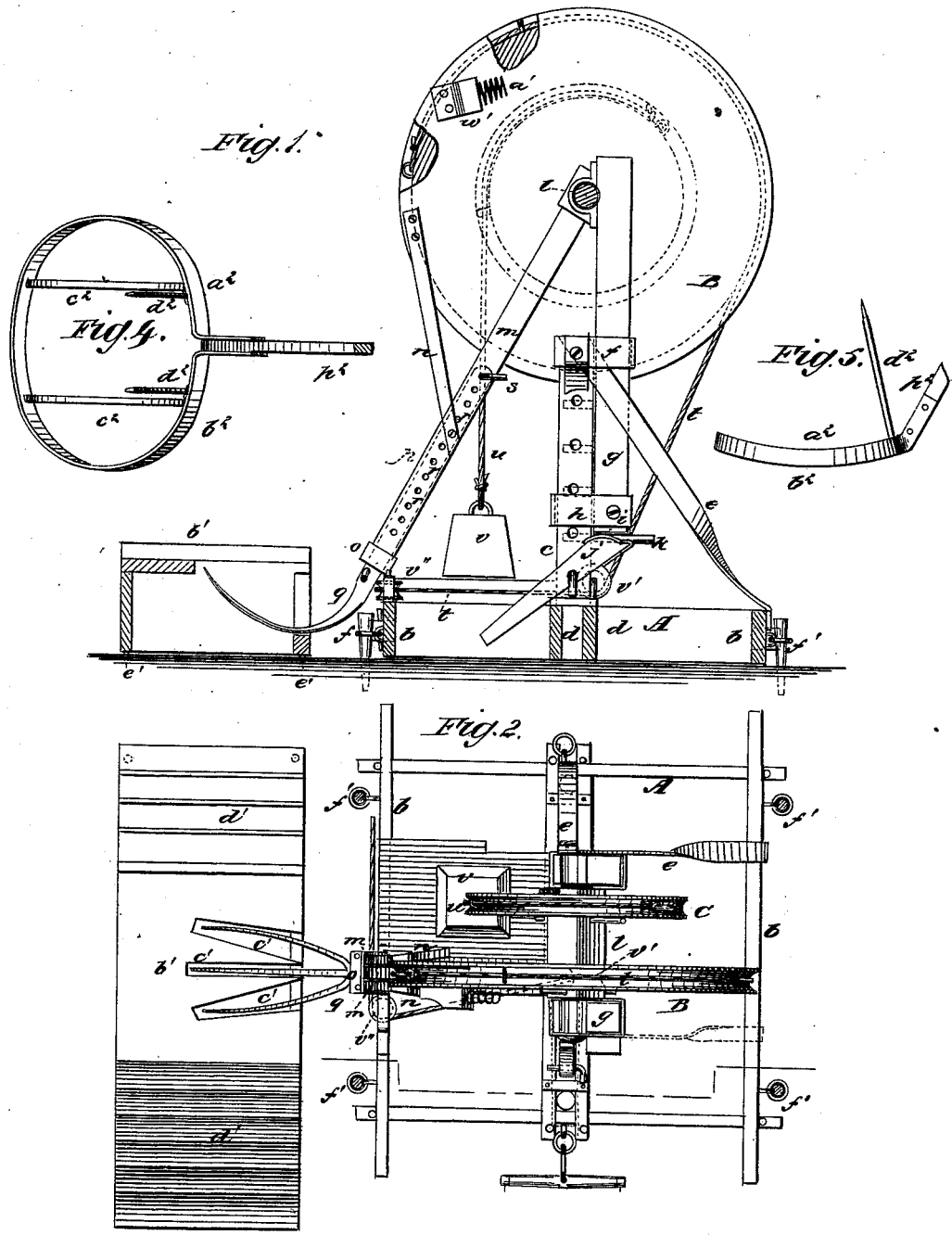

GEORGE L. JOHNSON, OF OCTAGON, INDIANA.

IMPROVEMENT IN HAY-LOADERS.

Specification forming part of Letters Patent No. 206,023, dated July 16, 1878; application filed June 6, 1878.

*To all whom it may concern:*

Be it known that I, GEORGE L. JOHNSON, of Octagon, in the county of Tippecanoe and State of Indiana, have invented a new and Improved Hay-Derrick, of which the following is a specification:

Figure 1 is a side elevation, partly in section, of my improved hay-derrick. Fig. 2 is a plan view. Fig. 3 is a detail view of the platform used in connection with the machine. Fig. 4 is a plan view of a straw-fork. Fig. 5 is a side elevation of the same.

Similar letters of reference indicate corresponding parts.

The object of my invention is to provide a derrick for rapidly loading or stacking hay and similar substances; and it consists in a grooved wheel carrying a fork and mounted on a shaft that is journaled in adjustable standards; and in the combination, with the said wheel, of a weight to return it after it has been moved in the operation of loading or stacking.

Referring to the drawing, A is a frame, whose side bars $b$ are rounded at the ends, forming runners, upon which to draw the derrick from place to place. Two standards, $c$, are secured between the cross-timbers $d$ of the frame A, and are provided with braces $e$, which stiffen and support them. The upper ends of the standards $c$ are provided with clips $f$ for securing the movable bars $g$, which are provided with clips $h$, that embrace the standards $c$. Plates $i$ are attached to the lower end of the movable bars $g$, which are engaged, when it is desired to raise the said bars by cam-levers $j$, and are supported by pins $k$, that are inserted in holes in the standards $c$ as the bars $g$ are raised. The pivots of the levers $j$ are carried by the levers, and are inserted in holes in the standards $c$ as the bars $g$ are raised. A grooved wheel, B, is secured to the shaft $l$, which is journaled in the movable bars $g$. Two arms, $m$, are secured to the wheel, one upon each side, and are stiffened by braces $n$. The arms $m$ project beyond the periphery of the wheel B, and are connected at their outer ends by a band, $o$. Between the arms $m$ the shank $p$ of the fork $q$ is placed. In the arms $m$ there are transverse holes $r$ for receiving the pin $s$, which also passes through the end of the shank $p$. By means of this arrangement the fork $q$ may be projected more or less from the ends of the arms $m$. A grooved wheel, C, is secured to the shaft $l$, and to it is attached a rope, $u$, which is secured to a weight, $v$, which counterbalances the weight of the arms $m$ and fork $q$. A rope, $t$, is attached to and wound upon the wheel B, and passes under a pulley, $r'$, and around a pulley, $v''$, secured to the frame A, and extends along the side of the frame, and is provided with a ring, to which a horse is hitched. The wheel B carries a bracket, $w'$, to which is attached a buffer-spring, $a^1$, which strikes the bar $g$, and arrests the motion of the wheel without causing an injurious shock. A platform, $b^1$, having slots $c^1$ for receiving the tines of the fork $q$, is placed near the derrick, and is designed to drive upon with a load of hay, which is left on the platform above the tines of the fork. The platform has inclined sides $d^1$, and is provided with spurs $e^1$, which enter the ground and prevent slipping. The frame A is provided with rings $f'$, through which stakes are driven into the ground to prevent the derrick from moving.

The operation is as follows: The hay or other substance to be loaded or stacked is placed upon the platform $b^1$ above the tines of the fork $q$, and the rope $t$ is drawn until the hay is carried upward and delivered to the stack, where the rope $t$ is released, and the weight $v$ returns the parts to their normal position, and the operation is repeated.

In Figs. 4 and 5, $a^2$ is a fork, which is designed to take the place of the fork $q$ when the machine is used for stacking straw. This fork consists of an elliptical hoop, $b^2$, which is secured to the shank $p^2$, and is provided with transverse bars $c^2$, which are parallel with the line of the shank $p^2$, and are placed a suitable distance apart to support the straw placed on the hoop. Two tines, $d^2$, project from the upper edges of the hoop, for supporting the straw as it is carried over the wheel $b$.

When the fork $a^2$ is used the platform $b^1$ may be dispensed with. This fork is designed more particularly for receiving straw from a thrashing-machine and carrying it to the stack.

Having thus described my invention, I claim as new and desire to secure by Letters Patent—

1. The combination of the adjustable fork $q$ with the wheel B, substantially as and for the purpose specified.

2. The combination, with the adjustable fork, of wheel B, operating-rope $t$, wheel C, and counterbalance-weight $r$, substantially as shown and described.

3. The combination of the buffer-spring $a^1$ with the wheel B, substantially as herein shown and described.

4. The fork $a^2$, consisting of the shank $p^2$, hoop $b^2$, cross-bars $c^2$, and tines $d^2$, substantially as shown and described.

5. The combination, in a hay-derrick, of the movable bars $g$, cam-levers $j$, and wheel B, carrying the fork $q$, as herein shown and described.

6. The platform $b^1$, having slots $c^1$, in combination with the fork $q$, as herein shown and described.

GEORGE LACON JOHNSON.

Witnesses:
MOSES CAMPBELL,
JOSEPH WALSH.